United States Patent [19]

Wild et al.

[11] Patent Number: 4,793,601
[45] Date of Patent: Dec. 27, 1988

[54] KEY SPRING

[75] Inventors: Peter Wild, Mettmenstetten; Johannes Rometsch, Rickenbach; Werner U. Frey, Thalwil; Karl Iseli, Wadenswil, all of Switzerland

[73] Assignee: Alcatel N.V., Amsterdam, Netherlands

[21] Appl. No.: 530,881

[22] Filed: Sep. 7, 1983

[30] Foreign Application Priority Data

Sep. 9, 1982 [CH] Switzerland ............... 5361/82

[51] Int. Cl.[4] ........................................... F16F 1/20
[52] U.S. Cl. ........................................ 267/165; 267/47
[58] Field of Search ............... 267/164, 165, 158, 47, 267/85, 87, 103, 109

[56] References Cited

U.S. PATENT DOCUMENTS

| | | | |
|---|---|---|---|
| 1,250,549 | 12/1917 | Bowman | 267/158 X |
| 1,256,124 | 2/1918 | Gelling | 267/47 |
| 1,792,343 | 2/1931 | Wikander | 267/47 |
| 1,958,778 | 5/1934 | Balduf | 267/165 X |
| 2,680,641 | 6/1954 | Schonitzer | 267/158 X |
| 4,112,284 | 9/1978 | Leworthy | 200/340 |
| 4,301,345 | 11/1981 | Balta | 200/314 |

FOREIGN PATENT DOCUMENTS

| | | | |
|---|---|---|---|
| 2330533 | 1/1975 | Fed. Rep. of Germany | 267/158 |
| 2359971 | 6/1975 | Fed. Rep. of Germany. | |
| 665188 | 4/1929 | France | 267/47 |
| 1398010 | 3/1965 | France | 267/165 |
| 285645 | 2/1928 | United Kingdom | 267/47 |

Primary Examiner—George E. A. Halvosa
Attorney, Agent, or Firm—Spencer & Frank

[57] ABSTRACT

In order to save space and manufacturing costs a pull-off effect for the operation of a key should be achieved by using a single spring. Thus the spring must have an arc-like force vs. displacement characteristic having a maximum of force about on half-way of the key stroke. This is achieved by a meander-like shaped spring (1) of flat material having two end loops (2, 3) of equal height and one middle loop (4) of about twice this height, all these loops lying within the same plane. The mounted spring is pretensioned in two directions being perpendicular to each other and lying in said plane, the operating force being applied to the top (7) of the middle loop.

4 Claims, 2 Drawing Sheets

KEY SPRING

The present invention relates to a spring for resetting the stem of a key element which spring exhibits within a given stroke an arc-like force vs. displacement characteristic having a maximum of force substantially at half the displacement.

Keys having an arc-like force vs. displacement characteristic of the stem spring, i.e. with a more or less pronounced pull-off effect are often used for special keyboards, but seldom for usual alpha-numeric keyboards.

From the prior art there is known to receive within a given stroke an arc-like force vs. displacement characteristic by using a combination of three pressure springs each having a linear force vs. displacement characteristic and being connected at one end to each other in a pivotable manner whereas the other ends of two of the springs are pivotably supported at points symmetrically arranged below the connection point of the three springs and the other end of the third spring has a fixed support below of and equally distanced from the two points.

When a pressure is exerted onto the connection point in the direction of the axis of the third spring all of the three springs are compressed. Firstly the pressure to be exerted onto the connection point increases along the displacement less than proportional to have a maximum when the connection point is on a straight line with the supporting points of the two first springs. Thereafter the actuating force decreases as the two first-named springs can expand and act upon the third spring in the same direction as the actuating force. As long as the combined spring force of the two first-named springs is smaller than the resetting force of the third spring the connection point of the three springs returns to the rest position when the actuating force is released.

It is obvious that this solution is relatively expensive and space consuming. It is small wonder that simpler solutions are desired. One of these solution uses rubber domes as stem springs whereby the rubber domes of an entire keyboard can be combined in a single rubber mat. Another solution to achieve a pull-off effect is to provide a spring-loaded cam in the key stem travel. Further, it has been proposed to use two or more leaf springs for achieving a pull-off effect. The two last-mentioned solutions provide a very pronounced pull-off effect.

All these solutions, with the exception of the rubber domes, exhibit the disadvantage that the are very space consuming. Especially for keyboards with an ergonomically correct design where the keys have to have a small height there is only limited available space so that the same element has to be used to provide the pull-off effect and to reset the stem. In view of economical production and storage it is further desirable to be able to mount into a key element a spring with a linear or alternatively, a spring with an arc-like force vs. displacement characteristic as it is proposed for the key element described in applicants' co-pending application. A solution with rubber domes could fulfill most of the above requirements, but this is a rather expensive solution since the desired high number of admissible actuations requires the use of special rubber mixtures.

It is therefore an object of the present invention to provide a spring for resetting the stem of a key element which spring is small and cheap, consists of only one piece and exhibits an arc-line force vs. displacement characteristic to provide a pull-off effect.

The spring according to the invention is characterized in that it consists of only one piece, that it has the shape of a meander with at most three loops lying within a plane, that with an unoperated key the loops of the mounted spring are pretensioned with respect to their width and their height, the pretension with respect to the width influencing the shape of the arc-like characteristic and the pretension with respect to the height influencing the amount of the starting actuating force, and that when the key is operated the spring changes its shape within said plane, the ends of the spring being able to pivot about an axis perpendicular to said plane, the arrangement being such that when the key is operated a pull-off effect is achieved and a defined spring force is present at the start and at the end of the displacement of the stem.

The invention will be best understood form the following description of an embodiment taken in conjunction with the accompanying drawing in which.

Figure 1:
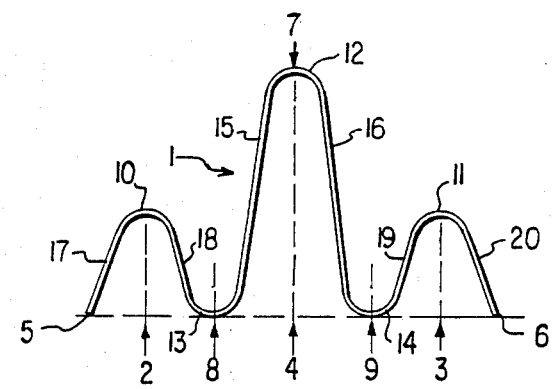
FIG. 1 shows a stem spring in the not-pretensioned condition.

The spring 1 shown in FIG. 1 in a not-pretensioned condition and highly enlarged compared with reality consists of flat material with exemplary dimensions of 2.45 mm width×0.065 mm depth. It has been determined that a particularly suitable length:thickness (depth) ratio for the flat material is between 400:1 and 600:1. Quantitative specifications discussed hereunder have been based upon this preferred embodiment, and are not therefore intended to act as limitations. Preferably naturally hard stainless steel is used. Obviously it is possible to use other spring materials, e.g. one of the usual cuprous spring alloys or synthetic materials. The use of a corrosion resistant material is advantageous in order to have no adverse influence on the alternating bending strength when using the key in a corrosive atmosphere. The spring is shaped meander-like with two end loops 2 and 3 and one middle loop 4 of about twice the height, all loops lying within the same plane.

In not-pretensioned conditions, shown in FIG. 1, the meander consists of straight sections 15-20 which are interconnected by circular sections 10-14 having uniform bending radii of 0.75 mm. It has been found that these uniform bending radii should be at least five times the thickness of the flat material. The spring ends 5,6 are supporting points for the spring 1, said ends being able to pivot on respective supports 21, 22 of the key body about an axis perpendicular to said plane. At point 7 at the top of arc 12 interconnecting the two legs 15 and 16 of the middle loop 4 there is applied the operating force of the key.

The legs 17, 18 and 19, 20, respectively, of the end loops 2 and 3, respectively, enclose angles of 25°–50°, the angles between the legs 18 and 19, respectively, of the end loops 2 and 3 and the corresponding adjacent legs 15 and 16, respectively, of the middle loop 4 lie between 15°-30° and the legs 15 and 16 of the middle loop 4 enclose an angle between 10°-20°. It can be seen that these angles are decreasing from the ends of the spring to its middle.

Figure 2:
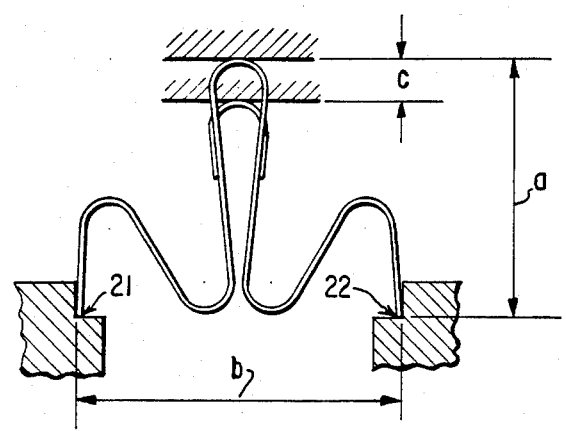
FIG. 2 shows a stem spring mounted in a key element with unoperated key.
Figure 3:
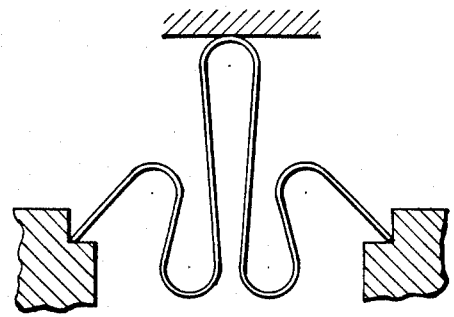
FIG. 3 shows the spring of FIG. 2 with half-way operated key.
Figure 4:
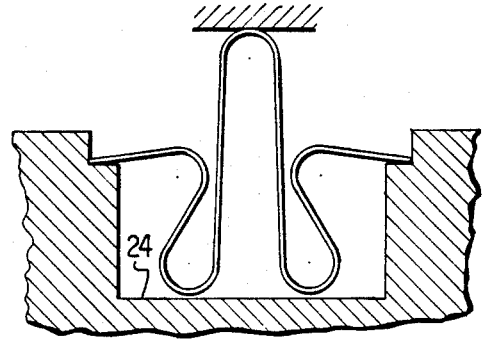
FIG. 4 shows the spring of FIG. 2 with fully operated key.
Figure 6:
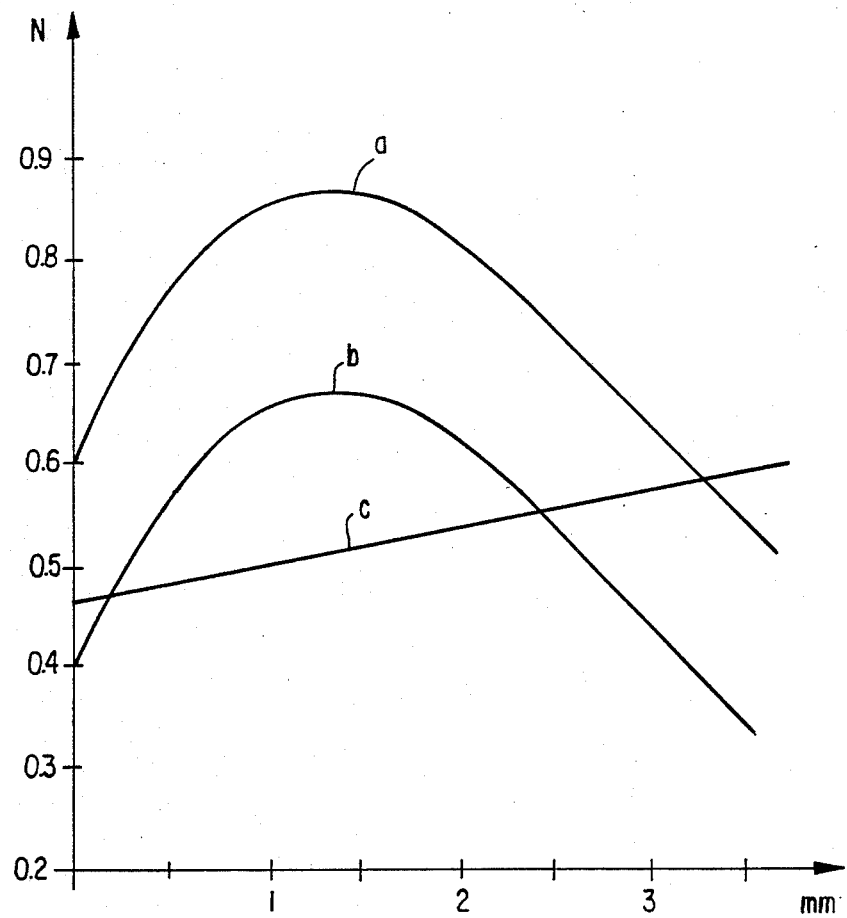
FIG. 6 shows force vs. displacement characteristics of different stem springs.

In the following FIGS. 2-4 showing the spring again highly enlarged at different stages of operation the reference numerals of the spring 1 are not repeated since they are identical with those of FIG. 1. In FIG. 2 the spring mounted in a key element is pretensioned by about 20% in horizontal direction between the supports 21, 22 having a distance b of at most 8 mm. For this reason the middle loop 4 is somewhat lifted so that the highest point 7 thereof urges the key stem against a stem stroke limiting abutment with the desired initial force shown in the force vs. displacement characteristic of FIG. 6 at a stem displacement zero, the spring arriving at height a of at most 10 mm. If the stem displacement increases linearly the operating force needed increases less than linearly and the spring ends 5, 6 pivot on their corresponding supports 21, 22 until the spring has with about half the displacement the shape as shown in FIG. 3 and the operating force needed passes its maximum as shown in FIG. 6 under (a) and (b). With a further linear increase of the displacement the end legs 17 and 20 rotate towards a horizontal position which is substantially arrived at the end position shown in FIG. 4 whereby the operating force needed decreases more than proportional and arrives at the end position with a displacement c of 3.5 mm about the same value as with displacement zero. It is seen therefore, that by using the aforementioned exemplary dimensions, a key spring has been produced with a functioning width b of less than 8 mm, a functioning height a less than 10 mm which is capable of keystrokes c up to substantially 4 mm.

As it can be seen from characteristics (a) and (b) of FIG. 6 it is possible to achieve within certain limits a parallel shift of the force vs. displacement characteristics with the same displacement by a suitable choice of the thickness of the flat material, 0.070 mm for characteristic (a) and 0.065 mm for characteristic (b). For comparison reasons this figure also includes the linear force vs displacement characteristic (c) of a helical spring. These illustrate that when operating the key it is mainly the connecting arcs, especially arcs 13 and 14, which change their shape. In fact the straight sections 15-20 of FIG. 1 are also bent by some amount, but this effect is not predominant in FIGS. 2-4.

Figure 5A:
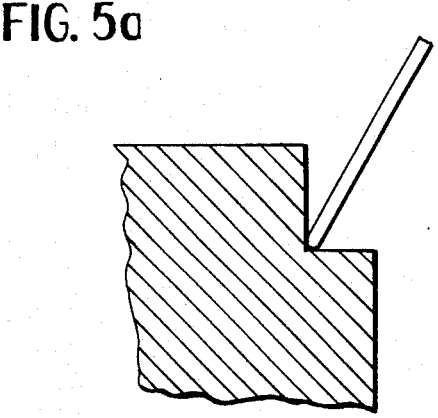
FIGS. 5a and 5b shows details of the spring design.
Figure 5B:
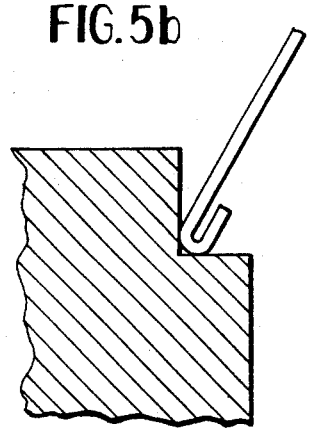

For those skilled in the art it is obvious that the lengths of the individual legs of the loops have to be choosen so that with the space available for the spring and with the desired displacement there is no friction between the arcs 10 and 11 and the legs 15 and 16 and that in the lowermost position of the key stem the arcs 13 and 14 do not contact the bottom 24 (FIG. 4) in order to not adversely influence the spring characteristic by friction forces. Friction forces could also result between the spring ends 5, 6 and the supports 21, 22 of the key body resulting not only in a change of the spring characteristic, but also in a detrimental abrasion. In order to avoid this it is proposed to round the spring ends either by removing the burr of the cuts of the spring ends by mechanical or chemical means, as shown in FIG. 5a, or by bending the ends of the spring, as shown in FIG. 5b.

Thus with the spring according to the invention it is possible to achieve within a strongly limited space with a single element a pull-off effect for the operation of a key, a defined starting force and a defined resetting force for the stem of the key. Commercially available flat material can be used for manufacturing the spring.

What is claimed is:

1. A one-piece spring comprising:
 a first loop at one end;
 a second loop at the other end, said second loop being of a substantially equal size to said first loop;
 a middle loop positioned between said first and second loops, said middle loop being of a greater size than either said first or said second loops, each of said loops lying within a plane;
 a first arcuate section connecting said first loop and said middle loop; and
 a second arcuate section connecting said middle loop and said second loop said first and second arcuate sections being of a substantially equal shape;
 wherein said spring is in a non-pretensioned state, said first and second loops having legs enclosing angles of 25°-50°, said middle loop having legs enclosing an angle of 10°-20°, and said first and second arcuate sections each having legs enclosing an angle of 15°-30° thereby yielding a spring having an arced stress curve when said spring is displaced while in a pretensioned state, said stress curve yielding greatest resistance at substantially one-half displacement.

2. The one-piece spring of claim 1, wherein said spring is produced from a flat material, said flat material having in an unshaped condition a length:thickness ratio of between 400:1–600:1.

3. The one-piece spring of claim 2, wherein each of said arcuate sections having radii at least five times the thickness of said flat material.

4. The one-piece spring of claim 2, wherein said spring has a direction of operation, said spring having in a non-operated state a length less than 8 mm along an axis extending perpendicularly to said direction of operation, a height less than 10 mm along an axis extending parallel to said direction of operation, and an operating stroke, said stroke being along said direction of operation, said stroke not exceeding 4 mm.

* * * * *